United States Patent [19]

Kaneko et al.

[11] Patent Number: 5,030,051
[45] Date of Patent: Jul. 9, 1991

[54] SCREW RIVET

[75] Inventors: Yoshio Kaneko; Kazumasa Kurihara, both of Utsunomiya, Japan

[73] Assignee: Nifco Inc., Yokohama, Japan

[21] Appl. No.: 576,778

[22] Filed: Sep. 4, 1990

[30] Foreign Application Priority Data

Sep. 12, 1989 [JP] Japan .............................. 1-106165[U]

[51] Int. Cl.⁵ .............................................. F16B 13/06
[52] U.S. Cl. ........................................ 411/55; 411/41; 411/48; 411/59
[58] Field of Search ....................... 411/15, 44, 55, 57, 411/60, 73, 59, 41, 45, 48

[56] References Cited

U.S. PATENT DOCUMENTS

| 4,311,421 | 1/1982 | Okada et al. | 411/59 |
| 4,460,298 | 7/1984 | Solarz et al. | 411/59 |
| 4,610,587 | 9/1986 | Wollar et al. | 411/59 |
| 4,878,791 | 11/1989 | Kurihara et al. | 411/55 |

FOREIGN PATENT DOCUMENTS 908531  4/1954  German Democratic Rep. ... 411/60

Primary Examiner—Neill R. Wilson
Attorney, Agent, or Firm—Oblon, Spivak, McClelland, Maier & Neustadt

[57] ABSTRACT

A screw rivet includes a screw and a grommet. The grommet has internal steps for meshing with external threads of the screw. The internal steps are formed on the inner periphery of an expansible portion of a leg of the grommet split by axial slits, and have a staircase-like sectional profile.

3 Claims, 4 Drawing Sheets

SCREW RIVET

BACKGROUND OF THE INVENTION

1. Field of the Invention

This invention relates to a screw rivet for coupling together a plurality of overlapped panels, or the like.

2. Description of the Prior Art

Prior art screw rivets of this type comprise a screw which includes a head and a threaded pin depending from the lower surface of the head and having external threads, and a grommet which is a one-piece plastic molding and includes a flange facing the head of the screw, a leg depending from the lower surface of the flange, a bore extending through the flange into the leg and permitting insertion of the threaded pin of the screw, ridges provided on the inner surface thereof defining the bore at an intermediate position thereof and each meshed with the groove between the adjacent external threads of the screw, a plurality of radially spaced-apart axial slits splitting the leg, and a plurality of expansible portions individually located between adjacent slits and capable of being pushed and expanded by the threaded pin of the screw inserted into the bore (as disclosed in U.S. Pat. Nos. 4,311,421, 4,878,791, 4,478,545 and 4,367,995, for instance).

When using such a prior art screw rivet for coupling together a plurality of overlapped panels, the leg of the grommet is inserted through holes formed in the panels until the lower surface of the flange comes into contact with the uppermost panel, and then the external threads of the screw are forcibly pushed into the bore of the grommet to cause expansion of the expansible portions of the grommet, thus effecting the coupling of the panels. When removing the screw, it is turned in the direction which causes it to rise owing to the meshing of the thread grooves and the ridges of the grommet.

However, in the prior art screw rivet noted above, the ridges of the grommet project toward the axis of the bore thereof. Therefore, when inserting the screw, the external threads thereof and the ridges of the grommet strike and clear each other, and in this way the external threads of the screw forcibly proceed into the bore of the grommet. At this time, both the external threads and the ridges are squeezed or otherwise deformed or damaged. Consequently, the degree of meshing between the thread grooves and the ridges is reduced, thus adversely affecting the screw turn-up operation.

In molding a grommet, the bore thereof is formed by extracting a core pin. However, since the ridges project inwardly within the bore, the core pin has to be forcibly extracted. If the extent of projection of the ridges is increased, forcible extraction of the core pin becomes difficult. For this reason, the extent of projection of the ridges cannot be increased. Inevitably, therefore, the ridges are meshed with the thread grooves only slightly, leading to an incomplete screw turn-up operation.

SUMMARY OF THE INVENTION

This invention has been accomplished in view of the above, and its object is to provide a rivet body which does not require forcible extraction of a core pin when molding it and has internal steps for of being reliably meshed with external threads of the core pin.

To attain the above object of the invention, there is provided a screw rivet in which internal steps of a grommet thereof are formed on the inner periphery of a leg axially split into expansible portions by slits (for instance a tapered portion, a small-diameter portion and stepped portions), are capable of being meshed with external threads of a screw and the steps have a staircase-like sectional profile.

Since the screw rivet according to the invention has the staircase-like internal steps provided on the inner periphery of the expansible portions, when expansion of the expansible portions is caused by pushing the external threads of the screw into the bore of the grommet such that the internal steps fit the external threads of the screw. Thus, reliable meshing can be obtained without the possibility of crushing both threads and steps, and it is possible to maintain excellent screw turn-up performance.

The above and other features and objects of the invention will become apparent with the following detailed description made with reference to the attached drawings.

DESCRIPTION OF THE PREFERRED EMBODIMENT

Figure 1:
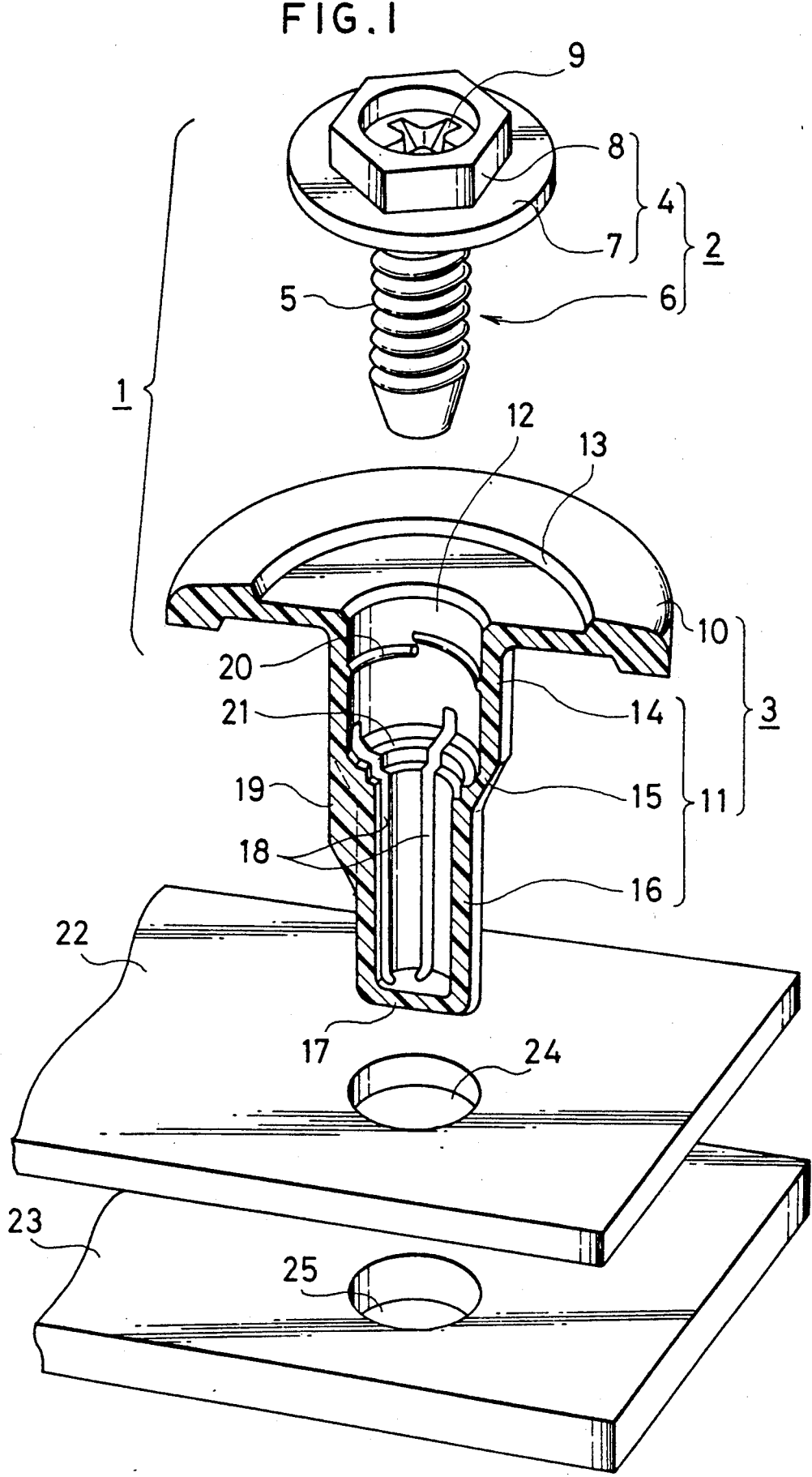
FIG. 1 is an exploded perspective view, partly in section, showing one embodiment of the screw rivet according to the invention.
Figure 2:
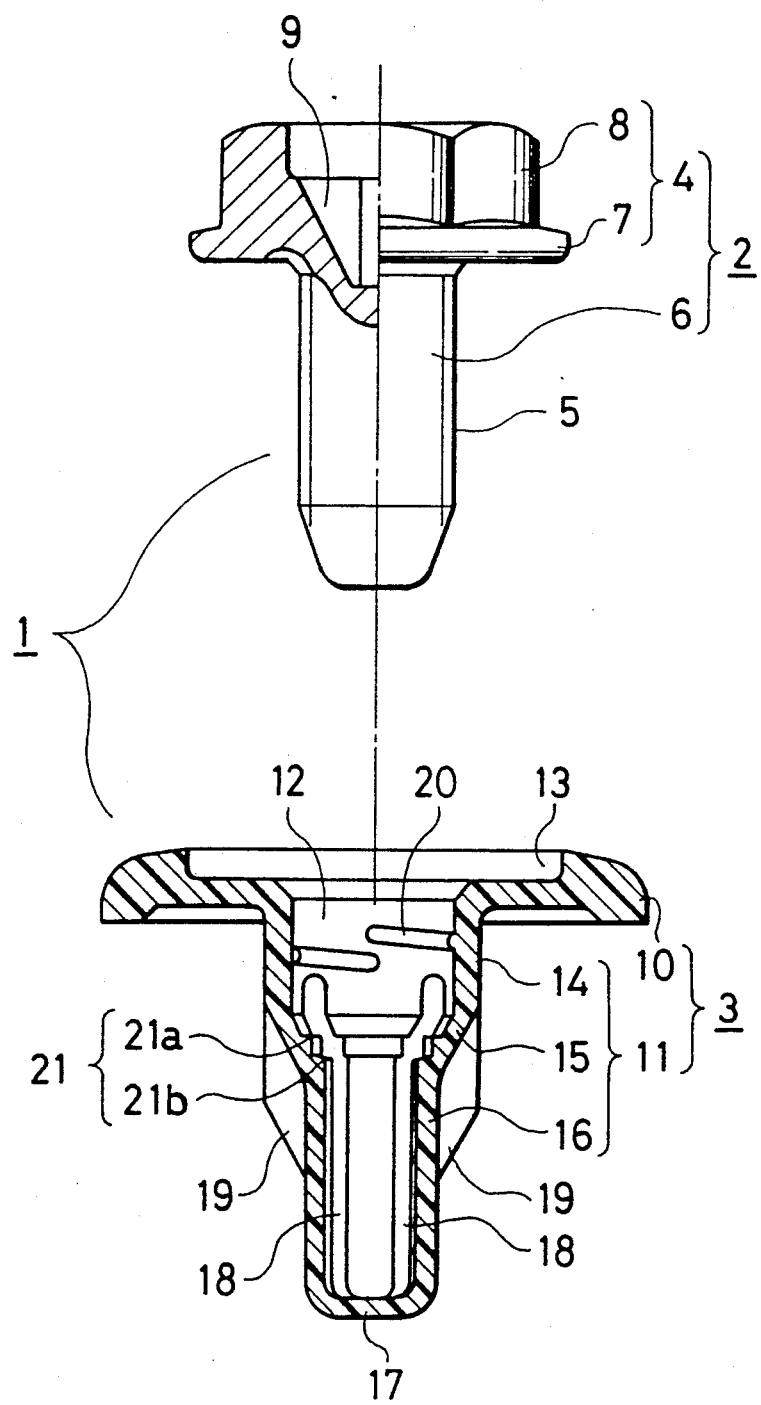
FIG. 2 is an exploded sectional view showing the screw rivet shown in FIG. 1.

The drawings illustrate one embodiment of the screw rivet according to the invention.

Reference numeral 1 generally designates the screw rivet which comprises a screw 2 and a grommet 3. The screw 2 and grommet 3 are respective one-piece moldings of a plastic material.

The screw 2 includes a head 4 and a threaded pin 6 depending from the lower surface of the head 4 and having external threads 5. It is a one-piece molding of a plastic material having comparatively high hardness, such as polypropylene.

The head 4 has a thin disk-like stem 7 and a raised portion 8 integrally extending from the top of the stem 7 and having a shape like a hexagonal nut. The top center of the raised portion 8 is formed with a recess 9 having a shape adapted to receive a cross-shaped, bar-shaped or hexagonal screwdriver tip.

The grommet 3 includes a flange 10 adapted to face the head 4 of the screw 2 and a leg 11 depending from the lower surface of the flange 10. The grommet 3 has a blind bore 12 extending through a central portion of the flange 10 into the leg 11 such that the external threads 5 of the screw 2 can be inserted into the bore. It is a one-piece molding of a material having adequate rigidity and elasticity, such as Nylon 6.

The flange 10 is disklike and has a diameter greater than the head 4 of the screw 2. It has an annular recess 13 formed around the top opening of the bore 12 such that the stem 7 of the screw 2 can snugly fit in the annular recess 13.

The leg 11 is a substantially cylindrical hollow portion closed at the lower end 17. It consists of a large-diameter portion 14 depending cylindrically from the lower surface of the flange 10 and having an inner diameter substantially equal to the outer diameter of the threaded pin 6 of the screw 2, a tapered portion 15 extending in a continuous fashion from the lower end of the large-diameter portion 14 and having a smallest lower end inner diameter smaller than the outer diameter of the threaded pin 6 of the screw 2, and a small-diameter portion 16 cylindrically extending from the lower end of the tapered portion 15 and having an inner diameter equal to the smallest inner diameter of the tapered portion 15.

The leg 11 has a plurality of, i.e., four in the illustrated embodiment, axial slits 18 radially spaced around the center of the bore 12 and extending from a axially intermediate position of the large-diameter portion 14 through the tapered and small-diameter portions 15 and 16. The leg 11 further has a plurality of stepped portions 19 (four stepped portions 19 in this embodiment) each formed between adjacent slits 18 and extending from the tapered portion 15 to an axially intermediate portion of the small-diameter portion 16.

The inner periphery of the large-diameter portion 14 of the leg 11 is formed at an axially intermediate position with a helical thread 20 for temporary locking, which has a pitch matched to the pitch of the external threads 5 of the screw 2 and adapted to be slightly meshed in the grooves of the external threads 5 of the screw 2. The inner diameter of the large-diameter portion 14, the inner diameter of the thread 20, the outer diameter of the external threads 5 of the screw 2 and the groove diameter of the external threads 5 are set, for instance, respectively to 60 mm, 57 mm, 58 mm and 49 mm, so that the thread 20 fits slightly in the groove of the external threads 5 of the screw 2.

The substantially conical inner peripheral surface of the tapered portion 15 of the leg 11 divided by the axial slits 18 is formed with internal steps 21 matched to the pitch of the external threads 5 of the screw 2 and having a sectional profile having a plurality of steps (two steps in this embodiment). The inner periphery of the tapered portion 15 of the leg 11 is inclined by an angle of about 30 degrees with respect to the inner periphery of the large-diameter portion 14, and the inner diameters of the first and second steps of the internal steps 21 are set, for instance, to 44 mm and 34 mm, respectively. When the tapered portion 15 is urged and expanded by the threaded pin 6 of the screw 2 inserted into the bore 12, corners 21a and 21b of the first and second steps of the internal steps 21 mesh with the external threads 5.

A method of forming the grommet 3 will now be briefly described. The grommet 3 is injection molded using a two-part die (not shown), and the bore 12 is formed by withdrawing a core pin (not shown). The thread 20 for temporary locking formed in the bore 12 slightly projects from the inner periphery of the large-diameter portion 14 into the bore 12. To form this thread, the core pin is formed with a recess (not shown) corresponding to the thread 20 and is forcibly withdrawn. Since the inner diameter of the large-diameter portion 14 of leg 11 is, at 60 mm, merely 3 mm larger than the inner diameter of the ridge 20, the core pin can be forcibly withdrawn with ease, with no danger of crushing the thread 20.

Further, where the thread 20 is not formed within the bore 12, since the internally stepped portion of the tapered portion 15 of the leg 11 has a staircase-like sectional profile progressively enlarged in diameter toward the opening of the bore 12, there is no need to use a large force for withdrawing the core pin, and it is possible to provide a strong catching action between the external threads steps 5 and the internal threads 21.

The method of use of the screw 2 and grommet 3 having the above constructions will now be described. Initially, the threaded pin 6 of the screw 2 is inserted to a slight extent into the bore 12 of the grommet 3 from the top opening of the bore 12.

Figure 3:
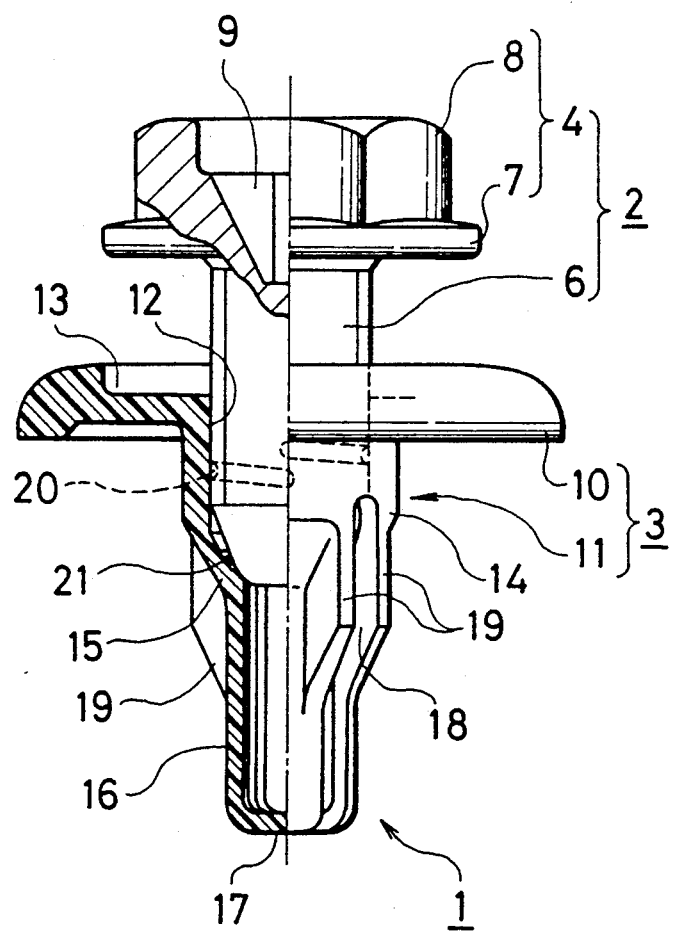
FIG. 3 is a side view, with the left half in section, showing a temporarily assembled state of a screw and a grommet of the screw rivet.

When the threaded pin 6 of the screw 2 has been inserted within the bore 12, one of the external threads 5 abuts the thread 20 slightly projecting from the inner periphery of the large-diameter portion 14. When the threaded pin 6 is further forcibly inserted, the external threads 5 clear the thread 20 while pushing and slightly deforming the thread 20, thus allowing the thread 20 to be slightly fitted in one groove of the external threads 5. Consequently, the threaded pin 6 is restrained in the bore 12 of the grommet 3 (FIG. 3). Thus, the threaded pin 6 of the screw 2 does not withdraw from the bore 12 of the grommet 3. This state is a temporarily assembled state, in which the screw 2 and grommet 3 are integrally engaged with each other for facilitating a subsequent operation of securing overlapped panels to one another. The threaded pin 6 of the screw 2 can be temporarily secured to the grommet 3 simply by causing one of the external threads 5 to clear the thread 20 of the grommet 3. Alternatively, however, the temporarily assembled state can be achieved by inserting the threaded pin 6 until its tip strikes the tapered portion 15 with a smaller inner diameter than the outer diameter of the threaded pin 6 in the bore 12.

For securing two overlapped panels 22 to 23 to each other by using the screw rivet 1 in the temporarily assembled state, two panels 22 and 23 are overlapped and their holes 24 and 25, which are formed at predetermined positions and have a diameter slightly greater than the outer diameter of the large-diameter portion 14 of the grommet 3, are aligned. Then, the leg 11 of the grommet 3 is inserted downwardly through the aligned holes 24 and 25.

When the lower surface of the flange 10 of the grommet 3 strikes the upper surface of the upper panel 22, the head 4 of the screw 2 is strongly pushed into the grommet 3. Consequently, the threaded pin 6 which has been slightly inserted into the bore 12 of the grommet 3 is advanced from its position at the large-diameter portion 14 into the tapered portion 15. At this time, the threaded pin 6 wedges into the tapered portion 15, the inner diameter of which is small than the outer diameter of the threaded pin 6 and progressively becomes smaller toward the closed end 17. Thus, the tapered portion 15 is pushed radially outwardly by the outer periphery of the threaded pin 6.

Figure 4:
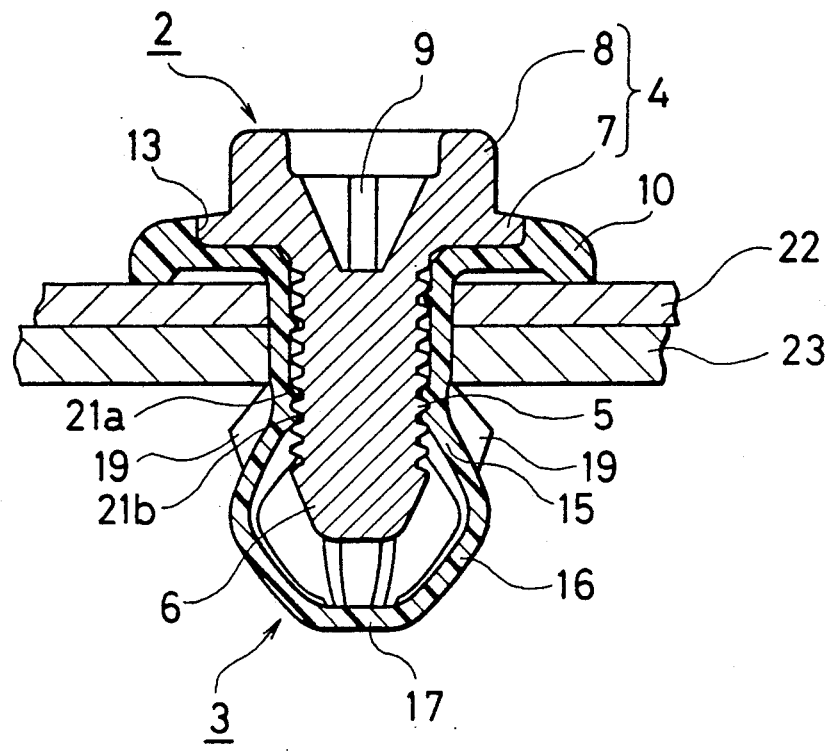
FIG. 4 is a sectional view showing the screw rivet in use.
Figure 5:
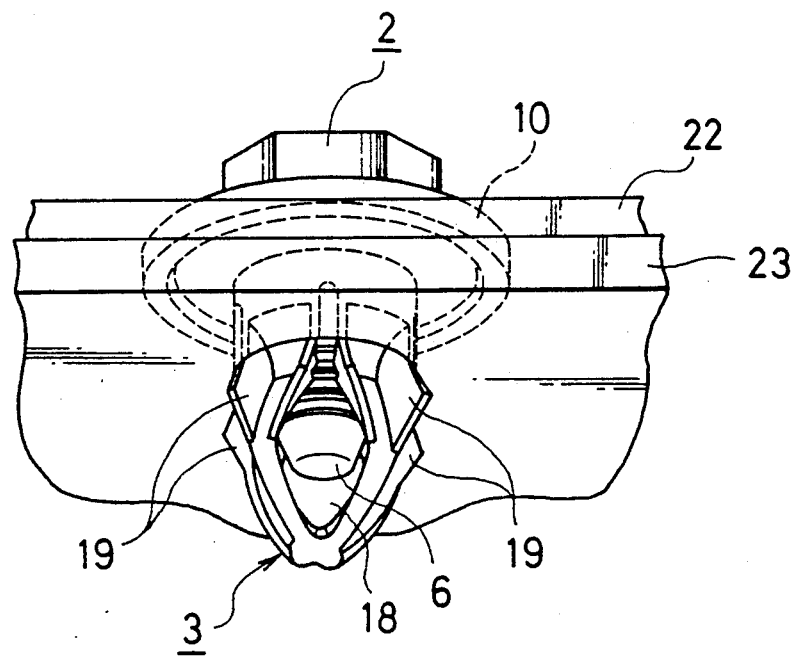
FIG. 5 is an obliquely upward perspective view showing the screw rivet in the state of FIG. 4.

Consequently, the tapered and small-diameter portions 15 and 16 which are axially split by the slits 18 are expanded radially outwardly under the lower panel 23 (FIG. 4). With this expansion of the tapered portion 15 the inner periphery of the internal steps 21 thereof meshes with the outer periphery of the external threads 5, thus restraining the threaded pin 6 against withdrawal from the bore 12 of the grommet 3. Although upper and lower corners 21b and 21a of the female steps 21 engage in the associated grooves of the external threads 5 of the threaded pin 6, the pin 6 can pass through the tapered portion 15 without requiring excessive force because the tapered portion 15 repeats alternate expansion and contraction owing to the slits 18 during the passage of the pin 16.

Meanwhile, as the tapered and small-diameter portions 15 and 16 are expanded, the upper ends of the stepped portions 19 extending from the outer periphery are brought into contact with the lower surface of the lower panel 23 and cooperate with the lower surface of the flange 10 to clamp the panels 22 and 23 from above and below. Thus, the panels 22 and 23 are secured to each other in the overlapped state.

The amount by which the screw 2 can be pushed in is limited by the position at which the lower surface of the disk-like stem 7 comes into contact with the open upper surface of the annular recess 13 of the flange 10 and at this time, the stem 7 is substantially snugly received in the recess 13 of the flange 10.

For releasing the coupled state of the panels 22 and 23 for maintenance or other purposes, the screw 2 is turned in the appropriate direction with a screwdriver (not shown) fitted in the cross-shaped recess 9 of the head 4 of the screw 2. By turning the screw 2 in this way, the threaded pin 6 of the screw 2 is gradually raised from the bore 12 of the grommet 3 due to the mesh between the external steps 5 and the internal threads 21 of the grommet 3. Thus, the tapered and small-diameter portions 15 and 16 of the grommet 3, which have been expanded under the lower panel 23, are gradually contracted to be restored to the substantially initial state by the elastic restoring force of their material.

With this contraction of the tapered and smalldiameter portions 15 and 16 of the grommet 3, the stepped portions 19 on the outer periphery are contracted under the lower panel 23 to a diameter sufficient to be withdrawn through the holes 24 and 25 of the panels 22 and 23. Now, the screw 2 may be recovered by withdrawing it from the holes 24 and 25 of the panels 22 and 23, and the panels 22 and 23 can be separated from each other.

The thread 20 for temporary locking tends to turn up the screw 2 because it is meshed, although slightly, with the groove of the external threads 5 of the pin 2. However, since the degree of is slight, the pin 2 is liable to be idly rotated with respect to the thread 20 by a twisting force applied to the screwdriver fitted in recess 9. Usually, therefore, it is difficult to turn up the screw 2 further from the temporarily assembled state, and the grommet 3 is recovered in a state of having the screw 2 temporarily secured thereto.

The recovered screw rivet 1 may be re-used for again securing two overlapped panels 22 and 23 to each other.

The arrangement that the bore 12 of the grommet 3 is made blind and that the lower ends of the divisions of the small-diameter portion 16 split by the axial slits 18 are united together at the closed lower end 17, is effective for providing satisfactory restoration of the tapered and small-diameter portions 15 and 16 when the screw 2 is turned upwards. The bore 12 is of course not required to be blind, and the closed end 17 may be omitted if a sufficient restoring property is imparted to the leg.

In the illustrated embodiment, the helical thread 20 for temporary locking is provided within the bore 12 of the grommet 3. However, the helical thread 20 is by no means limitative, and a merely dot-like ridge is sufficient. Further, it may be omitted altogether if temporary locking is unnecessary.

Further, the hexagonal nut shaped raised portion 8 provided on the head 4 of the screw 2 is intended to permit rotation of the screw 2 with a spanner or the like fitted on it. However, it may be omitted. Further, while the screw 2 is made of a plastic material, it is possible to utilize a metal bolt or screw instead.

As has been described in the discussion, with the screw rivet according to the invention the inner periphery of the expansible portion of the leg of the grommet split by the slits is provided with the internal steps such that the internal steps are meshed with the external threads when and only when the expansible portion is expanded by the insertion of the screw into the bore of the grommet. Thus, there is no possibility of crushing either the threads or steps. In addition, the screw rivet may be re-used without deterioration of the initial screw turn-up performance. Further, since the internal steps portion has a staircase-like sectional profile, there is no need of forcibly withdrawing a core pin at the time of molding. Thus, molding can be readily effected. In addition, it is possible to set a great extent of mesh between the internal steps and the external threads of the pin.

What is claimed:

1. A screw rivet comprising:
    a screw and a grommet which are respective one-piece moldings,
    said screw including a head and a threaded pin depending from a lower surface of said head and having external threads,
    said grommet having a bore and including a flange facing said head of said screw, a leg depending from a lower surface of said flange and having a plurality of axial slits radially spaced apart for splitting said leg into a plurality of expansible portions, and internal steps provided on an inner periphery of said plurality of expansible portions for meshing with said external threads of said screw,
    said bore extending through said flange into said leg for receiving said threaded pin of said screw,
    said expansible portions being expanded when said threaded pin of said screw is inserted into said bore,
    said internal steps having a staircase-like sectional profile as a whole.

2. A screw rivet according to claim 1, wherein said grommet has a thread formed above said internal steps within said bore.

3. A screw rivet according to claim 1, wherein said grommet has a lower end for uniting lower ends of said plurality of expansible portions together.

* * * * *